US012523421B2

(12) United States Patent
Vovard et al.

(10) Patent No.: US 12,523,421 B2
(45) Date of Patent: Jan. 13, 2026

(54) METHOD FOR PRODUCING LIQUEFIED NATURAL GAS FROM NATURAL GAS, AND CORRESPONDING PLANT

(71) Applicant: TECHNIP ENERGIES FRANCE, Nanterre (FR)

(72) Inventors: Sylvain Vovard, Louveciennes (FR); Dominique Claude Jean Gadelle, Rueil Malmaison (FR)

(73) Assignee: TECHNIP ENERGIES FRANCE, Nanterre (FR)

( * ) Notice: Subject to any disclaimer, the term of this patent is extended or adjusted under 35 U.S.C. 154(b) by 290 days.

(21) Appl. No.: 18/037,319

(22) PCT Filed: Nov. 9, 2021

(86) PCT No.: PCT/EP2021/081084
§ 371 (c)(1),
(2) Date: May 16, 2023

(87) PCT Pub. No.: WO2022/106260
PCT Pub. Date: May 27, 2022

(65) Prior Publication Data
US 2023/0408187 A1    Dec. 21, 2023

(30) Foreign Application Priority Data
Nov. 17, 2020 (FR) ..................... 2011752

(51) Int. Cl.
*F25J 1/00*    (2006.01)
*F25J 1/02*    (2006.01)
*F25J 3/02*    (2006.01)

(52) U.S. Cl.
CPC ........... *F25J 1/0022* (2013.01); *F25J 1/0045* (2013.01); *F25J 1/005* (2013.01); *F25J 1/0055* (2013.01);
(Continued)

(58) Field of Classification Search
CPC ........ F25J 1/0214; F25J 1/0205; F25J 1/0264; F25J 2270/04; F25J 2210/06
See application file for complete search history.

(56) References Cited

U.S. PATENT DOCUMENTS

| 3,818,714 A | 6/1974 | Etzbach et al. |
| 5,363,655 A | 11/1994 | Kikkawa et al. |

(Continued)

FOREIGN PATENT DOCUMENTS

| JP | 2001165562 A | 6/2001 |
| JP | 2008503607 A | 2/2008 |

(Continued)

OTHER PUBLICATIONS

International Search Report and Written Opinion issued in corresponding PCT Patent Application No. PCT/ EP2021/081084 on Feb. 11, 2022.

*Primary Examiner* — Brian M King
(74) *Attorney, Agent, or Firm* — Troutman Pepper Locke LLP; Gabrielle L. Gelozin

(57) ABSTRACT

A method for producing an LNG from natural gas, comprising
  liquefaction of at least a first part of the natural gas in a first heat exchanger by heat exchange with a first mixed refrigerant fluid in a closed cycle,
  sub-cooling of liquefied natural gas in a second heat exchanger by heat exchange with a second refrigerant fluid of a second refrigeration cycle,
  expansion of the sub-cooled liquefied natural gas stream and admission into a flash gas separator,
  withdrawal of liquefied natural gas at the bottom of the separator, and withdrawal, at the head, of a gas flow, and supply of the second refrigeration cycle by at least a part of said gas flow.

10 Claims, 7 Drawing Sheets

(52) U.S. Cl.
CPC ............ *F25J 1/0219* (2013.01); *F25J 1/023* (2013.01); *F25J 1/0238* (2013.01); *F25J 1/0267* (2013.01); *F25J 1/0288* (2013.01); *F25J 3/0209* (2013.01); *F25J 3/0233* (2013.01); *F25J 3/0257* (2013.01); *F25J 2200/02* (2013.01); *F25J 2200/40* (2013.01); *F25J 2200/70* (2013.01); *F25J 2210/06* (2013.01); *F25J 2215/04* (2013.01); *F25J 2220/62* (2013.01); *F25J 2245/90* (2013.01); *F25J 2270/02* (2013.01); *F25J 2270/18* (2013.01); *F25J 2270/66* (2013.01); *F25J 2270/88* (2013.01)

(56) References Cited

U.S. PATENT DOCUMENTS

| | | |
|---|---|---|
| 6,378,330 B1 | 4/2002 | Minta et al. |
| 2005/0279133 A1 | 12/2005 | Eaton |
| 2010/0107684 A1* | 5/2010 | Minta .................... F25J 1/0297 62/623 |
| 2011/0067440 A1* | 3/2011 | Van Aken ............. F25J 1/0292 62/53.2 |
| 2016/0061517 A1* | 3/2016 | Seitter .................... F25J 1/0042 62/612 |
| 2016/0313057 A1* | 10/2016 | Roberts ................ F25J 1/0278 |
| 2019/0120548 A1* | 4/2019 | Pierre, Jr ................ F25J 1/004 |
| 2020/0064060 A1* | 2/2020 | Pierre, Jr. ............. F25J 1/0268 |
| 2020/0064062 A1* | 2/2020 | Liu ........................ F25J 1/0265 |

FOREIGN PATENT DOCUMENTS

| | | |
|---|---|---|
| JP | 2009504838 A | 2/2009 |
| JP | 201966165 A | 4/2019 |

* cited by examiner

METHOD FOR PRODUCING LIQUEFIED NATURAL GAS FROM NATURAL GAS, AND CORRESPONDING PLANT

CROSS-REFERENCE TO RELATED APPLICATIONS

This application is a U.S. National Stage filed under 35 U.S.C. § 371, based on International PCT Application No. PCT/EP2021/081084, filed on Nov. 9, 2021, which claims priority to French Application FR2011752 filed on Nov. 17, 2020 in the French Patent Office. The entire contents of these applications are incorporated herein by reference in their entirety.

BACKGROUND

Field of the Invention

The invention relates to a method for producing liquefied natural gas (LNG) from natural gas.

The invention further relates to a corresponding plant.

Description of Related Art

Natural gas is most often located in geographical areas far from the consumption areas. Such natural gas is thus liquefied for reducing the volume thereof by a factor of about 600 and is loaded into LNG carriers to be transported by sea to consumption centers.

For large liquefaction plants located on land, it is known how to use a cascade method, using three distinct nested refrigeration cycles, based on propane, ethylene and methane, respectively. Such plants have a low energy consumption but have a large footprint.

Another known method consists in using a refrigeration cycle using one or more mixed refrigerants (MR), because same consist of a mixture of a plurality of light hydrocarbons (in particular methane, ethane, propane, butane or pentane) and nitrogen. The compactness of the plant is thereby improved, while maintaining a good energy efficiency, or even improving the latter. In an industrial unit, the number of cycles using a mixed refrigerant can range from one to three. Energy efficiency is improved as the number of cycles increases.

The most commonly used method in LNG production plants is the "C3/MR" method, which uses a propane (C3) refrigeration cycle and a mixed refrigerant (MR) cycle. However, such method requires a large amount of equipment and thus maintains a relatively large footprint.

Single Mixed Refrigerant (SMR) methods exist, requiring less equipment than the two types of aforementioned methods, but to the detriment of energy efficiency. In addition, the Main Cryogenic Heat Exchanger (MCHE) is very tall (more than 50 m high) and involves additional construction costs.

It would be desirable, more particularly for small-capacity plants with an annual production of less than 1.5 million tonnes per annum (MTPA) of LNG, to reduce the total footprint (height and ground), without any consequence on energy performance or safety.

A goal of the invention is thus to propose a method apt to reduce the footprint of the production plant, in particular in height, compared to the "SMR" method.

SUMMARY

To this end, the invention relates to a method for the production of liquefied natural gas from natural gas, comprising the following steps:

cooling of at least a first part of the natural gas in a first heat exchanger by heat exchange with a first refrigerant fluid and obtaining a first stream of liquefied natural gas, the first refrigerant fluid being a mixed refrigerant, circulation of the first refrigerant fluid in a first closed refrigeration cycle, sub-cooling of the first liquefied natural gas stream in a second heat exchanger by heat exchange with a second refrigerant distinct from the first refrigerant, and obtaining a second sub-cooled liquefied natural gas stream, expansion of the second stream of sub-cooled liquefied natural gas, for forming a third stream of liquefied natural gas, and conveying of the third stream of liquefied natural gas into a flash gas separator, withdrawal, at the bottom of the flash gas separator, of the liquefied natural gas produced, circulation of the second refrigerant fluid in a second refrigeration cycle, said circulation comprising at least: a cooling of the second refrigerant fluid at least in the first heat exchanger by heat exchange with the first refrigerant fluid, for obtaining a stream of cooled second refrigerant fluid; an expansion of at least a part of the stream of cooled second refrigerant; obtaining a stream of cooled and expanded second refrigerant; and an intake of the stream of cooled and expanded second refrigerant fluid into the second heat exchanger, for cooling the first stream of liquefied natural gas, and withdrawal of a gas flow at the head of the flash gas separator and feeding the second refrigeration cycle with at least a part of the gas flow.

By means of the dissociation, from a thermodynamic point of view, of the steps of liquefaction and sub-cooling of the natural gas, the dimensions of the first heat exchanger, carrying out the liquefaction, are reduced. Such dissociation leads to more flexibility in the plant, due to the second exchanger dedicated to the sub-cooling step.

Reducing the dimensions of the first exchanger reduces in particular the height of the modular plants used for containing all the equipment needed for the LNG production unit, which reduces the volume and the weight of the associated structures, the manufacturing time, and requirements of transport to the LNG production site.

The method according to the invention reduces the overall dimensions of the liquefaction unit, without reducing the performance or the safety of the plant. Such improvement brings a very interesting savings, in particular when the construction of the plant is carried out in a modular manner, at sea or on land.

The method is perfectly suited for Floating Production Storage and Offloading (FPSO or FLNG) units, for fixed off-shore units (off-shore platforms, stranded barges, etc.) and modular plants on land.

The method is advantageously also applicable to the modification of existing plants, for increasing production with reduced footprint.

According to particular embodiments, the method according to the invention comprises one or more of the following characteristics, taken individually or according to all technically possible combinations:

a branching of a first part of the second refrigerant fluid out of the second refrigeration cycle, for producing a combustible gas;

cooling of a second part of the natural gas in a third heat exchanger by heat exchange with the second refrigerant fluid (62) and with the gas flow withdrawn from the head of the flash gas separator, and obtaining a fourth stream of liquefied natural gas; an expansion of the fourth stream of liquefied natural gas; and an intake of the fourth stream of expanded liquefied natural gas into the flash gas separator;

a branching of a second part of the second refrigerant fluid out of the second refrigeration cycle; a cooling of the second portion of the second refrigerant in one or the third heat exchanger by heat exchange with the gas flow withdrawn from the head of the flash gas separator and with a gas flow of second refrigerant coming from the second heat exchanger, and obtaining a second stream of cooled second refrigerant; an expansion of the second stream of cooled second refrigerant so as to obtain a second stream of cooled and expanded second refrigerant; and an intake of the second cooled and expanded refrigerant liquid stream into the second heat exchanger for cooling the first stream of liquefied natural gas;

said expansion of the stream of cooled second refrigerant fluid is carried out at least in part in an expansion valve;

the stream of cooled second refrigerant fluid is gaseous at the outlet of the first heat exchanger; said expansion of the stream of cooled second refrigerant fluid is carried out at least in part in a turbine; and said circulation of the second refrigerant fluid in the second refrigeration cycle comprises at least one compression of the second refrigerant fluid carried out by at least one compressor mechanically coupled to said turbine;

said cooling of the second refrigerant fluid further comprises a flow of the second refrigerant fluid through the second heat exchanger prior to said expansion of the stream of cooled second refrigerant fluid;

at least another part of the stream of cooled second refrigerant is expanded and taken into the flash gas separator; and an intake of the liquefied natural gas into a storage; a withdrawal of an evaporation gas from the storage; and a feeding of at least part of the evaporation gas into the second refrigeration cycle.

A further subject matter of the invention is a plant for the production of liquefied natural gas from natural gas, comprising:

a first heat exchanger suitable for cooling at least a first part of the natural gas by heat exchange with a first refrigerant fluid and for obtaining a first stream of liquefied natural gas, the first refrigerant fluid being a mixed refrigerant, a first closed refrigeration cycle suitable for circulating the first refrigerant fluid, a second heat exchanger suitable for sub-cooling the first stream of liquefied natural gas by heat exchange with a second refrigerant distinct from the first refrigerant, and for obtaining a second stream of sub-cooled liquefied natural gas, an expansion component suitable for expanding the second stream of sub-cooled liquefied natural gas and for forming a third stream of liquefied natural gas, a flash gas separator suitable for receiving the third stream of liquefied natural gas, a withdrawal system, at the bottom of the flash gas separator, suitable for withdrawing the liquefied natural gas produced, a second refrigeration cycle suitable for circulating the second refrigerant fluid, and for: cooling the second refrigerant fluid at least in the first heat exchanger by heat exchange with the first refrigerant fluid and obtaining a stream of cooled second refrigerant fluid; expanding at least a portion of the stream of cooled second refrigerant; obtaining a stream of cooled and expanded second refrigerant; and taking in the stream of cooled and expanded second refrigerant into the second heat exchanger, for cooling the first stream of liquefied natural gas; and a withdrawal system, at the head of the flash gas separator, suitable for withdrawing a gas flow, and for feeding the second refrigeration cycle with at least a part of said gas flow.

BRIEF DESCRIPTION OF THE SEVERAL VIEWS OF THE DRAWINGS

The invention will be better understood upon reading the following description, given only as an example and making reference to the enclosed drawings, wherein.

DETAILED DESCRIPTION

Throughout hereinafter, the same references will identify stream flowing through a pipe and the pipe which carries the stream. The terms "upstream" and "downstream" generally extend with respect to the normal direction of flow of a fluid.

Furthermore, unless otherwise indicated, the percentages mentioned are molar percentages, and the pressures are given in absolute bars.

Streams, the temperature of which is higher than ambient temperature, are described as being cooled by air coolers. In a variant, it is possible to use water heat exchangers, e.g. freshwater or seawater heat exchangers.

In the simulation calculations hereinafter, e.g. performed using the HYSYS software, the temperature of the cooling air or of water is 15° C.

The ambient temperature around the plant is not significant in the context of the invention and can be in particular comprised between 15° C. and 35° C.

It will be assumed hereinafter that all the compressors have a polytropic efficiency of 82% and all the turbines have an adiabatic efficiency of 86%.

Figure 1:
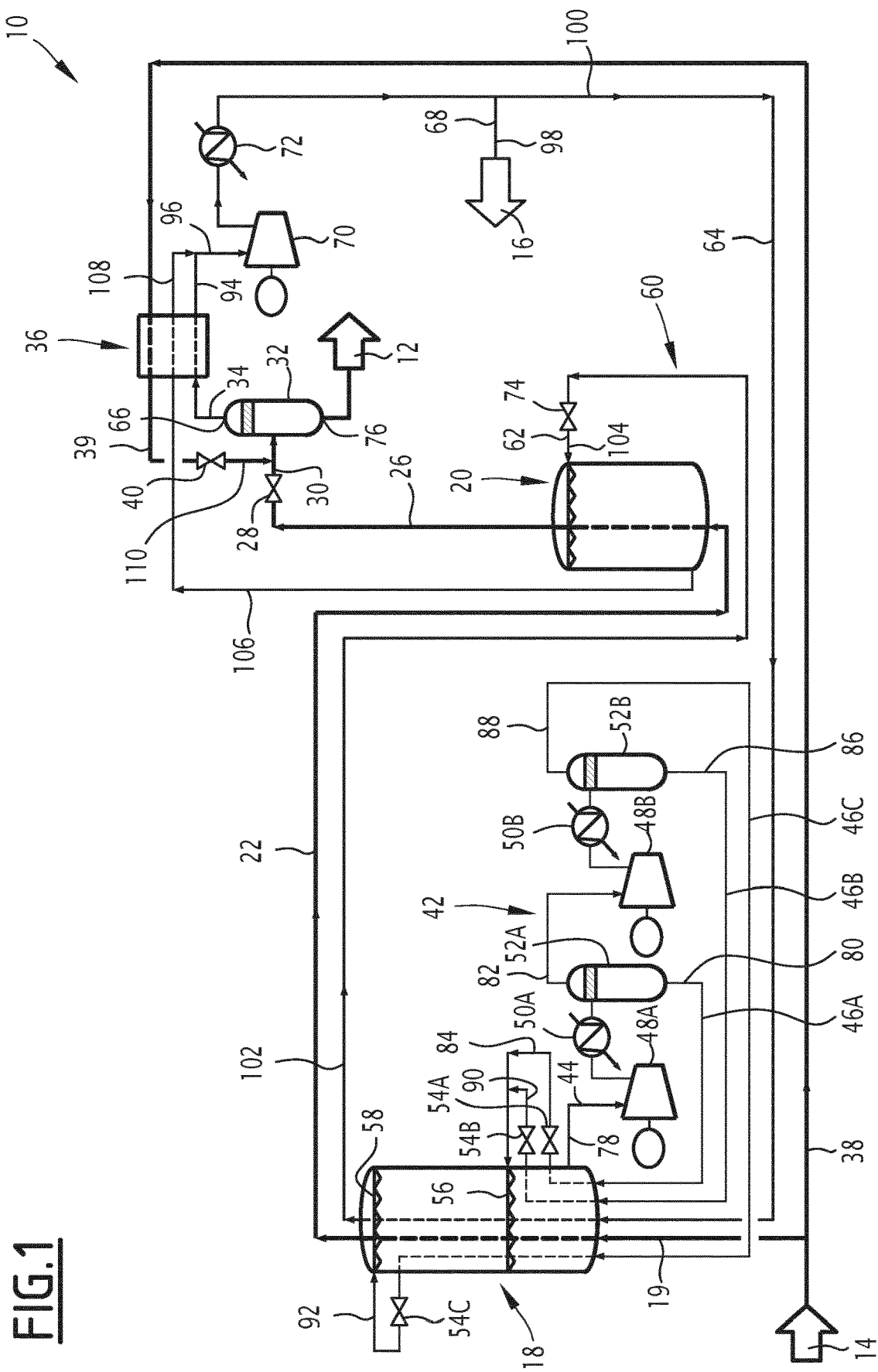
FIG. 1 is a block diagram of a plant implementing a method according to the invention.

With reference to FIG. 1, a plant 10 according to the invention is described, suitable for producing liquefied natural gas 12 from natural gas 14. In the example, the plant 10 also produces a combustible gas 16 intended e.g. for supplying gas turbines of the plant, or other equipment.

In FIG. 1, the flows in bold lines relate to the natural gas intended for liquefaction, whereas the finer lines relate to the flows of refrigerant fluids.

In the example, the natural gas 14 is a pretreated gas, free of compounds able to solidify during liquefaction in the plant 10. Such a pretreatment is known per se and will not be described in detail; same can in particular include removing water, carbon dioxide and sulfur compounds from the raw natural gas.

According to a variant (not shown), the natural gas 14 is not pretreated. The plant then integrates equipment (not shown), such as alumina or molecular sieve beds, for carrying out the pretreatment and supplying the natural gas 14.

Natural gas 14 consists mainly of methane and has e.g. the following molar composition:
- methane: 92.0%
- ethane: 5.00%
- propane: 2.20%
- nitrogen: 0.80%
- i-C4, n-C4, i-C5: 0.00%.

The plant 10 comprises a first heat exchanger 18 intended for liquefying at least a first part 19 of the natural gas 14 and producing a first stream of liquefied natural gas 22, and a second heat exchanger 20 intended for sub-cooling the first stream of liquefied natural gas and for producing a second stream of sub-cooled liquefied natural gas 26. The plant 10 also comprises an expansion component 28 (valve or dynamic expansion turbine) for producing a third stream of sub-cooled and expanded liquefied natural gas 30, and a flash gas separator 32, herein a drum, for receiving the third stream of liquefied natural gas which is sub-cooled and expanded and for separating same into a gas flow 34 and the liquefied natural gas 12.

"Sub-cooling" means cooling to a temperature strictly below the liquefaction temperature.

The plant 10 advantageously comprises a third heat exchanger 36 for cooling, liquefying and sub-cooling a second part 38 of the natural gas 14 and obtaining a fourth stream of liquefied natural gas 39, and an expansion component 40 for expanding the fourth stream of liquefied natural gas.

The first heat exchanger 18 is cooled by a first refrigeration cycle 42 suitable for circulating a first refrigerant fluid 44 in counter-current with the first part 20 of the natural gas 14.

The first refrigeration cycle 42 is closed, i.e. same does not exchange material with the outside during normal operation. On the other hand, same can exchange material with the outside when filled or purged, in full or in part. The first refrigeration cycle 42 comprises e.g. three loops 46A, 46B, 46C passing through the first heat exchanger 18.

The first refrigerant fluid 44 is a mixed refrigerant. E.g. the first refrigerant fluid 44 comprises nitrogen, methane, ethane and/or ethylene, propane, butane and pentane.

E.g. the first refrigerant 44 has the following molar composition:
- methane: 26.27%
- ethane: 39.22%
- propane: 19.41%
- nitrogen: 0.00%
- i-C4, n-C4: 0.00%
- i-C5: 15.10%.

The first refrigeration cycle 42 comprises e.g. two compressors 48A, 48B, two coolers 50A, 50B, two separating tanks 52A, 52B, three expansion valves 54A, 54B, 54C and two distributor plates 56, 58 situated in the first heat exchanger 18.

The coolers 50A, 50B are e.g. air or water cooling heat exchangers, suitable for cooling the flows concerned to a temperature close to ambient air temperature or to the water temperature.

The 48A, 48B compressors can be integrated into the same machine with a single motor (or a gas turbine).

The first loop 46A passes successively through the compressor 48A, the cooler 50A, the bottom of the separator drum 52A, the expansion valve 54A and the distributor plate 56.

The second loop 46B passes successively through the compressor 48A, the cooler the top of the separator drum 52A, the compressor 48B, the cooler 50B, the bottom of the separator drum 52B, the expansion valve 54B and the distributor plate 56.

The third loop 46C passes successively through the compressor 48A, the cooler the top of the separator drum 52A, the compressor 48B, the cooler 50B, the top of the separator drum 52B, the expansion valve 54C and the distributor plate 58.

The second heat exchanger 20 is cooled by a second refrigeration cycle 60 suitable for circulating a second refrigerant fluid 62 in counter-current with the first stream of liquefied natural gas 22.

In the example shown, the third heat exchanger 36 is also cooled by the second refrigeration cycle 60, and advantageously by the gas flow 34 coming from the flash gas separator 32.

The second refrigeration cycle 60 is advantageously half-open. In the example, the second refrigeration cycle 60 comprises only one loop 64. The second refrigeration cycle 42 is suitable for being fed by the gas flow 34 coming from a withdrawal system 66 situated at the head of the flash gas separator 32. In the example shown, a branching 68 is used for producing the combustible gas 16 from the second refrigerant fluid circulating in the loop 64.

Still in the example shown, the loop 64 passes successively through a compressor a cooler 72, the first heat exchanger 18, an expansion valve 74, the second heat exchanger 20, and the third heat exchanger 36.

The second refrigerant fluid 62 has a composition distinct from the first refrigerant fluid 44. In principle, the second refrigerant fluid 62 has the composition of the gas flow 34, i.e. the composition of the flash gas resulting from the liquefaction of the natural gas.

A withdrawal system 76, situated at the bottom of the flash gas separator 32, is designed for supplying the liquefied natural gas 12 produced by the plant 10.

A first method according to the invention, implemented in the plant 10, will now be described.

The natural gas 14 is e.g. at a temperature of about 25° C., and at a pressure greater than 30 bar, e.g. about 70 bar. The flow-rate of the natural gas 14 is e.g. 3,015 kmols/hour, i.e. 54,205 kg/hour for the composition specified above.

In the example shown, the pretreated natural gas 14 is divided between the first part 19 and the second part 38.

The first part 19 is cooled and condensed in the first heat exchanger 18, e.g. to −126° C., to form the first liquefied natural gas stream 22. The first liquefied natural gas stream 22 is sub-cooled in the second heat exchanger 20, e.g. to −150° C., for forming the second stream of sub-cooled liquefied natural gas 26. The second stream of sub-cooled liquefied natural gas 26 is expanded in an expansion component 28, e.g. to 1.25 bar, to form the third sub-cooled and expanded liquefied natural gas stream 30.

The third sub-cooled and expanded liquefied natural gas stream 30 is taken into the flash gas separator 32. The liquefied natural gas 12 is withdrawn from the bottom of the flash gas separator 32 via the withdrawal system 76, e.g. with a production flow-rate of 49,588 kg/hour.

The first refrigerant fluid 44 circulates through the loops 46A, 46B, 46C of the first refrigeration cycle 42. The composition thereof can change according to the fractionations which take place in the separator drum 52A, 52B.

More precisely, a stream 78 of the first refrigerant fluid 44 is recovered at the bottom of the first heat exchanger 18, e.g. at 2.85 bar and 23° C. The stream 78 is compressed by the compressor 48A, e.g. to 20 bar, then cooled and partially condensed in the cooler 50A, e.g. to 25° C., and taken into the separator drum 52A, from which a liquid fraction 80 and a gaseous fraction 82 are extracted.

The liquid fraction 80 passes in co-current (with respect to the first part 19 of the natural gas to be liquefied) into the first heat exchanger 18 to be sub-cooled, then is expanded in the expansion valve 54A for forming a flow 84. The flow 84 is taken into the first heat exchanger 18 in counter-current, via the distributor 56.

The gaseous fraction 82 is compressed by the compressor 48B, e.g. to 40 bar, then cooled and partially condensed in the cooler 50B, e.g. to 25° C., and taken in the separator drum 52B, from which a liquid fraction 86 and a gaseous fraction 88 are extracted.

The liquid fraction 86 passes in co-current in the first heat exchanger 18 to be sub-cooled, and is then expanded in the expansion valve 54B, for forming a flow 90. The flow 90 is taken into the first heat exchanger 18 in counter-current, e.g. via the distributor 56. Advantageously, the flow 90 is substantially at the same pressure as the flow 84. According to a particular embodiment, the flow 90 and the flow 84 are added to each other before the intake thereof into the first heat exchanger 18.

The gaseous fraction 88 passes in co-current in the first heat exchanger 18 for being liquefied and sub-cooled and is then expanded in the expansion valve 54C for forming a flow 92. The flow 92 is taken into the first heat exchanger 18 in counter-current, via the distributor 58.

The predominantly liquid flows 84, 90, 92 are mixed and vaporized in the first heat exchanger 18, then recovered, approximately at ambient temperature, for forming the stream 78. The flow-rate of the stream 78 is e.g. 5.115 kmol/h.

The power consumed by the compressors 48A, 48B is e.g. 11,669 kW.

The gas flow 34 is withdrawn from the head of the flash gas separator 32 via the withdrawal system 66, e.g. at a flow-rate of 4,617 kg/hour. The gas flow 34 withdrawn is advantageously reheated in the third heat exchanger 36, e.g. in counter-current with the second part 38 of the natural gas 14, so as to form a reheated stream 94 which is taken, i.e. recycled, into the loop 64 of the second refrigeration cycle 60.

The heated flow 94 is merged in a flow 96 which is compressed in the compressor then cooled in the cooler 72. A part 98 of the flow 96 flows through the branching 68 to form the combustible gas 16. Another part 100 continues to flow through the loop 64 and forms the second refrigerant fluid 62.

The part 100 is cooled and liquefied in the first heat exchanger 18, e.g. in co-current with the part 19 of the natural gas 14, for forming a stream of cooled second refrigerant fluid 102.

The stream of cooled second refrigerant fluid 102 is expanded in the expansion valve 74 for forming a stream of cooled and expanded second refrigerant fluid 104, e.g. to 2.7 bar and −152° C.

The cooled and expanded second refrigerant fluid stream 104 is taken into the second heat exchanger 20, e.g. in counter-current with the first stream of liquefied natural gas 22, and vaporizes by sub-cooling the first stream of liquefied natural gas. A gas flow 106 of the second refrigerant fluid is recovered at the outlet of the second heat exchanger and sent into the third heat exchanger 36, e.g. in co-current with the gas stream 34, for forming a flow of heated gas 108.

The flow of heated gas 108 and the heated flow 94 are added to each other to form the stream 96.

The second part 38 of the natural gas 14 is cooled in the third heat exchanger 36 for obtaining the fourth stream of liquefied natural gas 39, which heats the gas flows 34 and 106. The fourth stream of liquefied natural gas 39 is expanded in the expansion valve 40, e.g. to 1.25 bar, for producing a stream 110 which is taken into the flash gas separator 32.

The energy consumption of the method is e.g. the following:

compressor 70: 2.8 MW
48A compressor: 9.7 MW
48B compressor: 1.9 MW
total: 14.4 MW By means of the features described hereinabove, the method is apt to reduce the footprint of the plant 10, in particular in comparison with the "SMR" method, with a gain of 10 to 15 meters in height. The dimensions of the first heat exchanger 18 are significantly reduced. Due to the second heat exchanger 20 dedicated to the sub-cooling step, the plant 10 is also more flexible, the composition of the refrigerant 42 will be better optimized due to the reduced temperature difference achieved within the exchanger 18. The method reduces the overall dimensions of the plant 10, without reducing performance or safety.

The reduction in the dimensions of the first heat exchanger 18 reduces in particular the height of the modular plants used for containing all the equipment needed for the LNG production unit.

Figure 2:
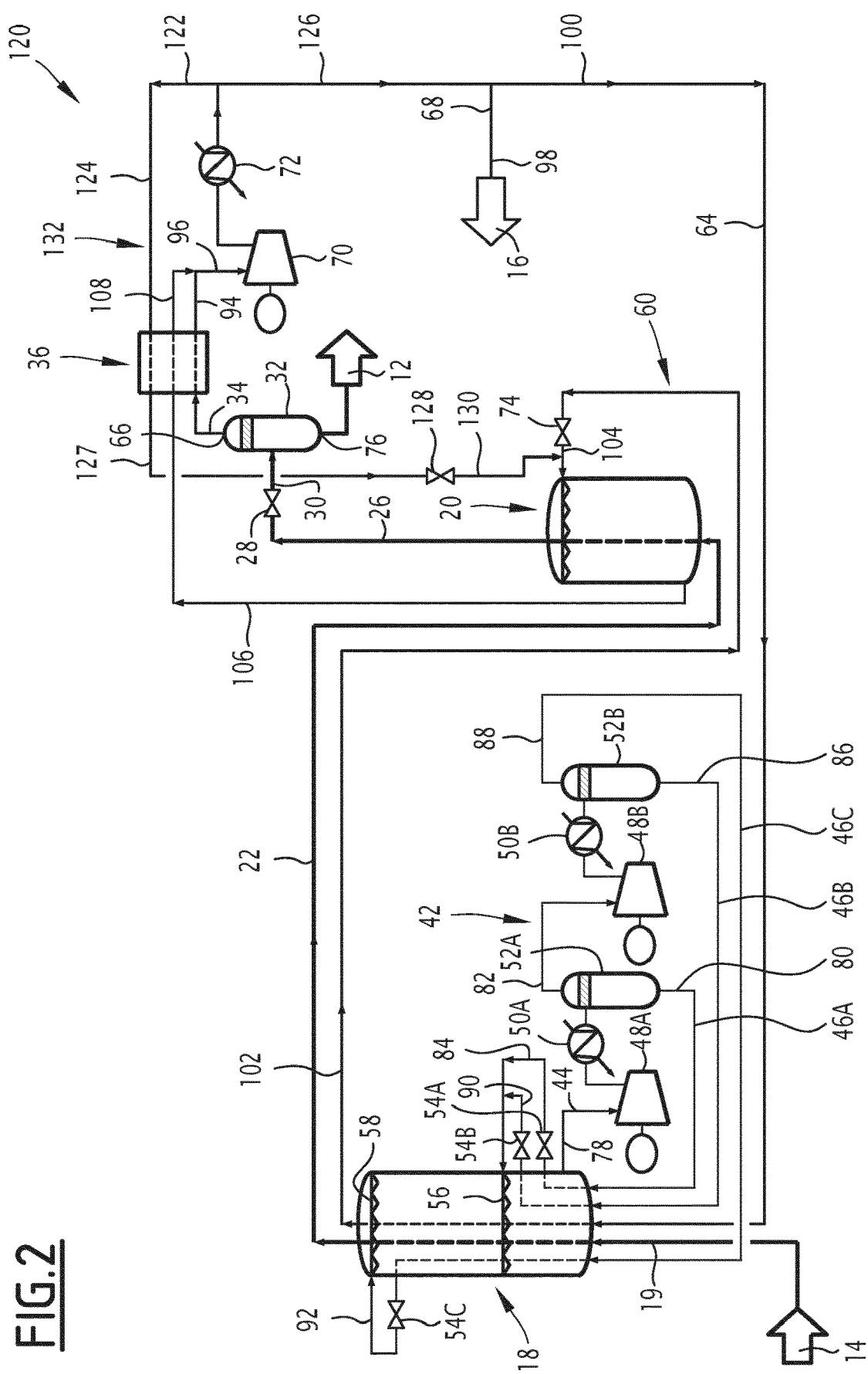
FIGS. 2 to 7 are block diagrams of variants of the plant shown in FIG. 1 and implementing variants of the method according to the invention.

With reference to FIG. 2, a plant 120 which is a variant of the plant 10, is described. The plant 120 is similar to the plant 10 shown in FIG. 1. Identical elements bear the same numerical references and will not be described again. Only the differences are described in detail hereinafter.

In the plant 120, the natural gas 14 is not divided into a first part 19 and a second part 38. All of the natural gas 14 is sent to the first heat exchanger 18 to be liquefied.

The second refrigeration cycle 60 comprises a second branching 122 for extracting a second part 124 of the second refrigerant fluid from the loop 64.

The second branching 122 is e.g. located downstream of the cooler 72 and upstream of the branching 68. In a variant (not shown), the second branching 122 is located downstream of the first branching 68.

In the example shown, the flow 96 circulating through the loop 64 is divided between the second part 124 and a flow 126 from which the flow 98 forming the combustible gas 16 is extracted. The remaining part 100 continues to flow through the loop 64.

The second part 124 is cooled in the third heat exchanger 36, e.g. in counter-current with the gas flows 34 and 106, to form a second stream cooled second refrigerant liquid stream 127.

The second stream of cooled second refrigerating liquid 127 is expanded in an expansion component 128, e.g. to 2.7 bar, for forming a second stream of cooled and expanded second refrigerating liquid 130.

The second stream of cooled and expanded second refrigerant liquid 130 is taken into the second heat exchanger 20 for cooling the first stream of liquefied natural gas 22. E.g., the second stream cooled and expanded second refrigerant liquid 130 is mixed with the stream of cooled and expanded second refrigerant liquid 104 before being taken into the second heat exchanger 20.

In the plant 120, it can be said that the second refrigeration cycle 60 comprises the loop 64, wherein the initial cooling of the second refrigeration fluid takes place in the first heat exchanger 18, and a new loop 132, wherein the initial cooling of the second refrigerant fluid takes place in the third heat exchanger 36.

Figure 3:
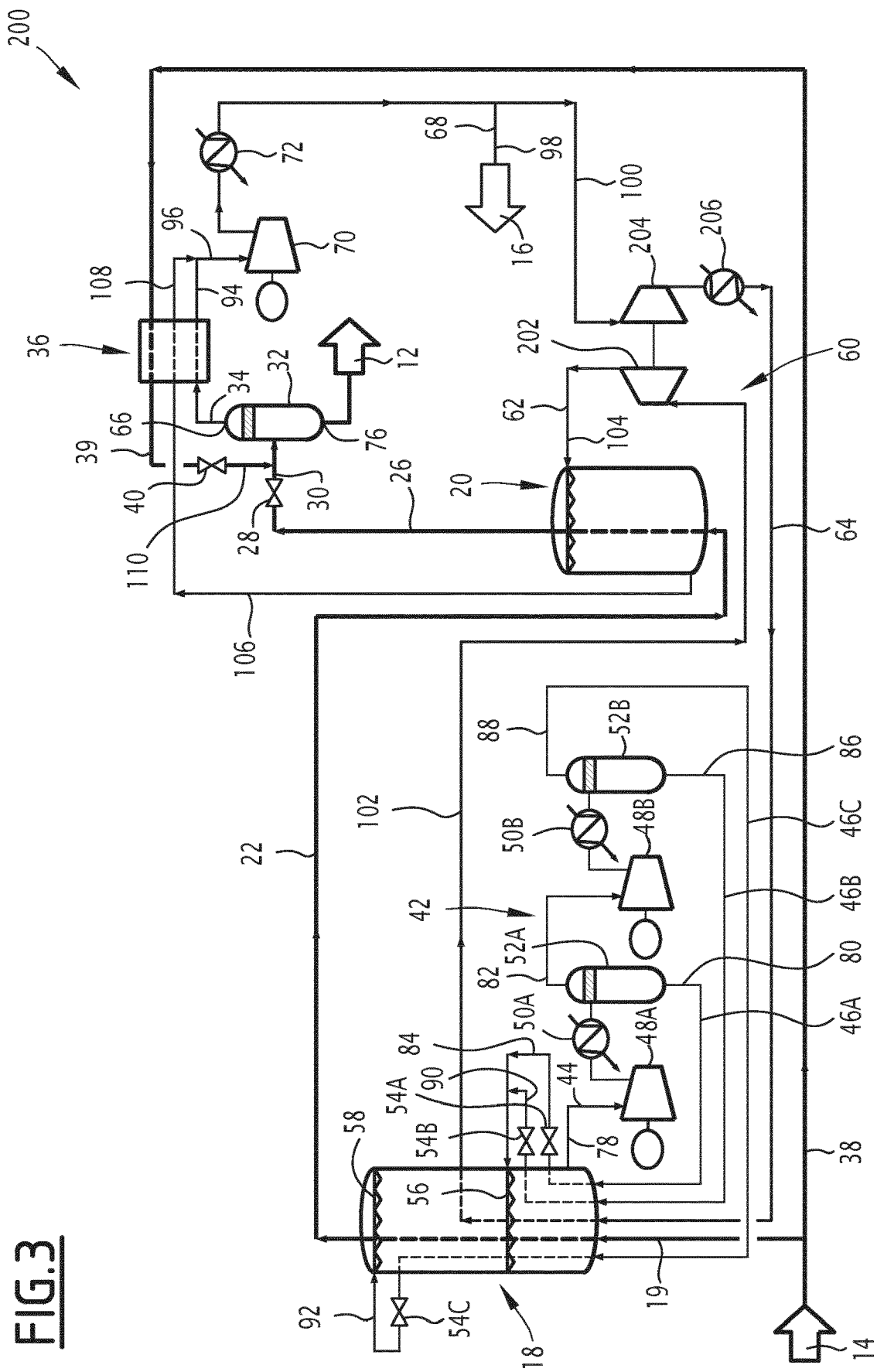

With reference to FIG. 3, a plant 200 which is a variant of the plant 10, is described. The plant 200 is similar to the plant 10 shown in FIG. 1. Identical elements bear the same numerical references and will not be described again. Only the differences are described in detail hereinafter.

The first heat exchanger 18 is configured so that the stream of cooled second refrigerant fluid 102 is gaseous, and not liquid, at the outlet of the first heat exchanger 18. The expansion of the stream of cooled second refrigerant fluid 102 is carried out, not in the expansion valve 74 shown in FIG. 1, but in a turbine 202.

The circulation of the second refrigerant fluid through the second refrigeration cycle further comprises a compression of the second refrigerant fluid, carried out by a compressor 204 mechanically coupled to the turbine 202.

The plant 200 advantageously comprises a cooler 206 situated between the compressor 204 and the first heat exchanger 18, in the loop 64.

Figure 4:
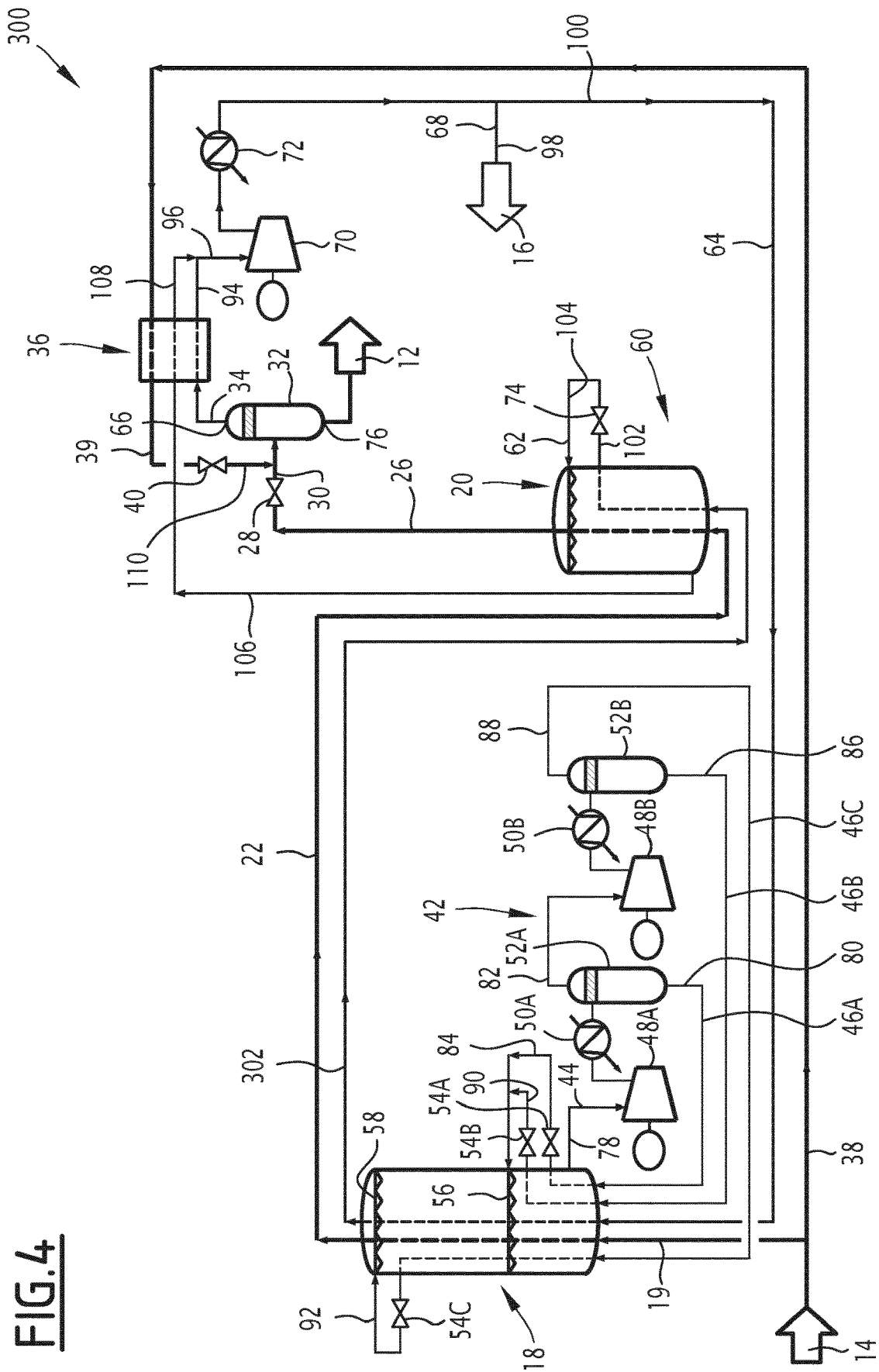

With reference to FIG. 4, a plant 300 which is a variant of the plant 10, is described. The plant 300 is similar to the plant 10 shown in FIG. 1. Identical elements bear the same numerical references and will not be described again. Only the differences are described in detail hereinafter.

The stream of cooled second refrigerant fluid 102 is obtained not only by the flow of the part 100 through the first heat exchanger 18, but also by a flow through the second heat exchanger 20.

More precisely, the part 100 of the second fluid flows through the first heat exchanger 18 for forming a cooled flow 302. The cooled flow 302 is then sub-cooled in the second heat exchanger 20, e.g. In co-current with the first liquefied natural gas stream 22, for obtaining the stream of second cooled refrigerant fluid 102.

Figure 5:
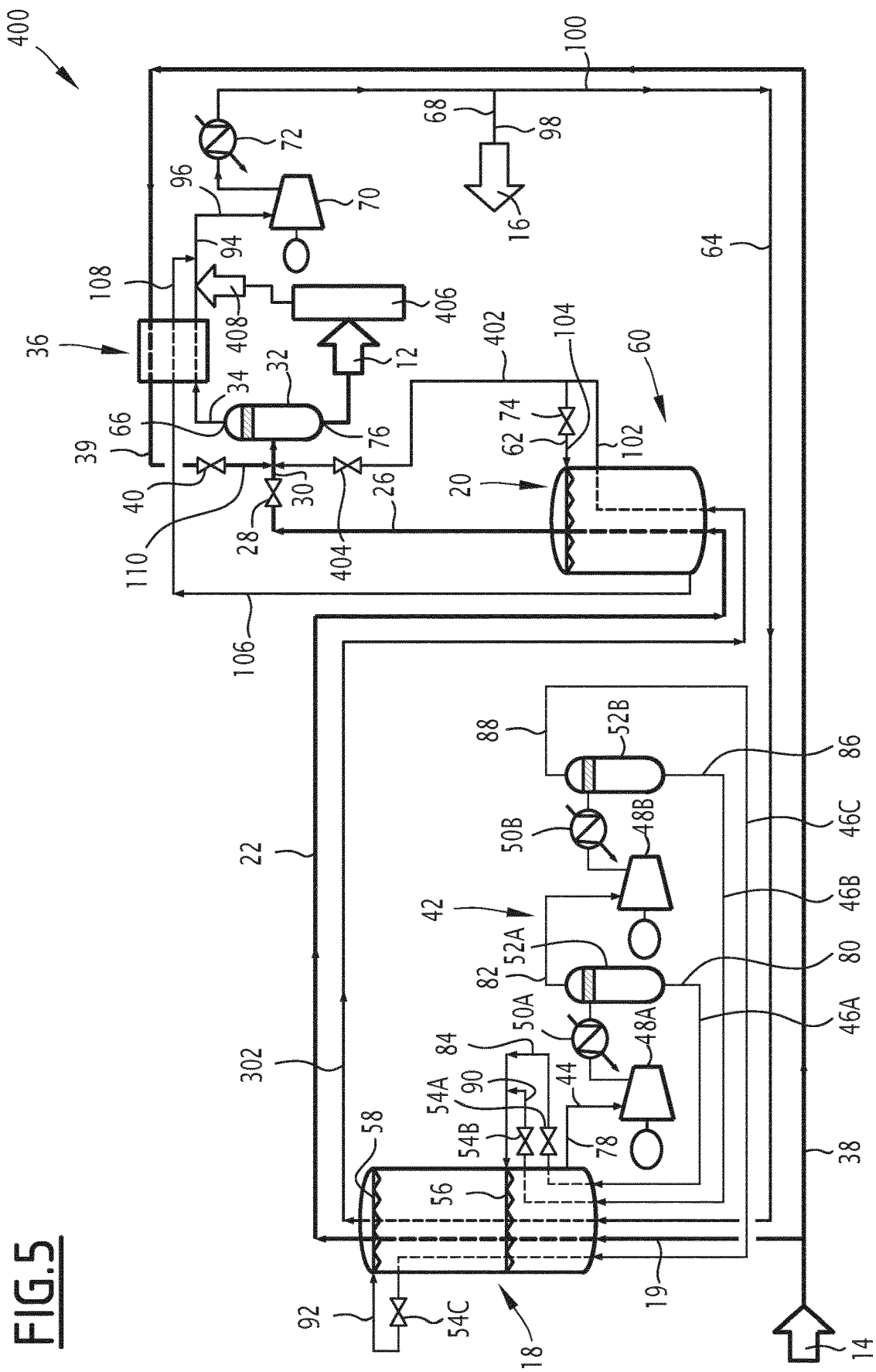

With reference to FIG. 5, a plant 400 which is a variant of the plant 300, is described. The plant 400 is similar to the plant 300 shown in FIG. 4. Identical elements bear the same numerical references and will not be described again. Only the differences are described in detail hereinafter.

Only a part of the stream of cooled second refrigerant fluid 102 is expanded in the valve 74 for forming the stream of cooled and expanded second refrigerant fluid 104.

Another part 402 of the stream of cooled second refrigerant fluid 102 is expanded in an expansion valve 404 and taken into the flash gas separator 32.

The plant 400 advantageously comprises a storage 406 receiving the liquefied natural gas 12 coming from the flash gas separator 32.

An evaporation gas 408 (boil-off gas or BOG) is taken from the storage 406 and feeds the second refrigeration cycle 60. More precisely, the evaporation gas 408 is added to the heated flow 94, e.g. upstream of the compressor 72.

Figure 6:
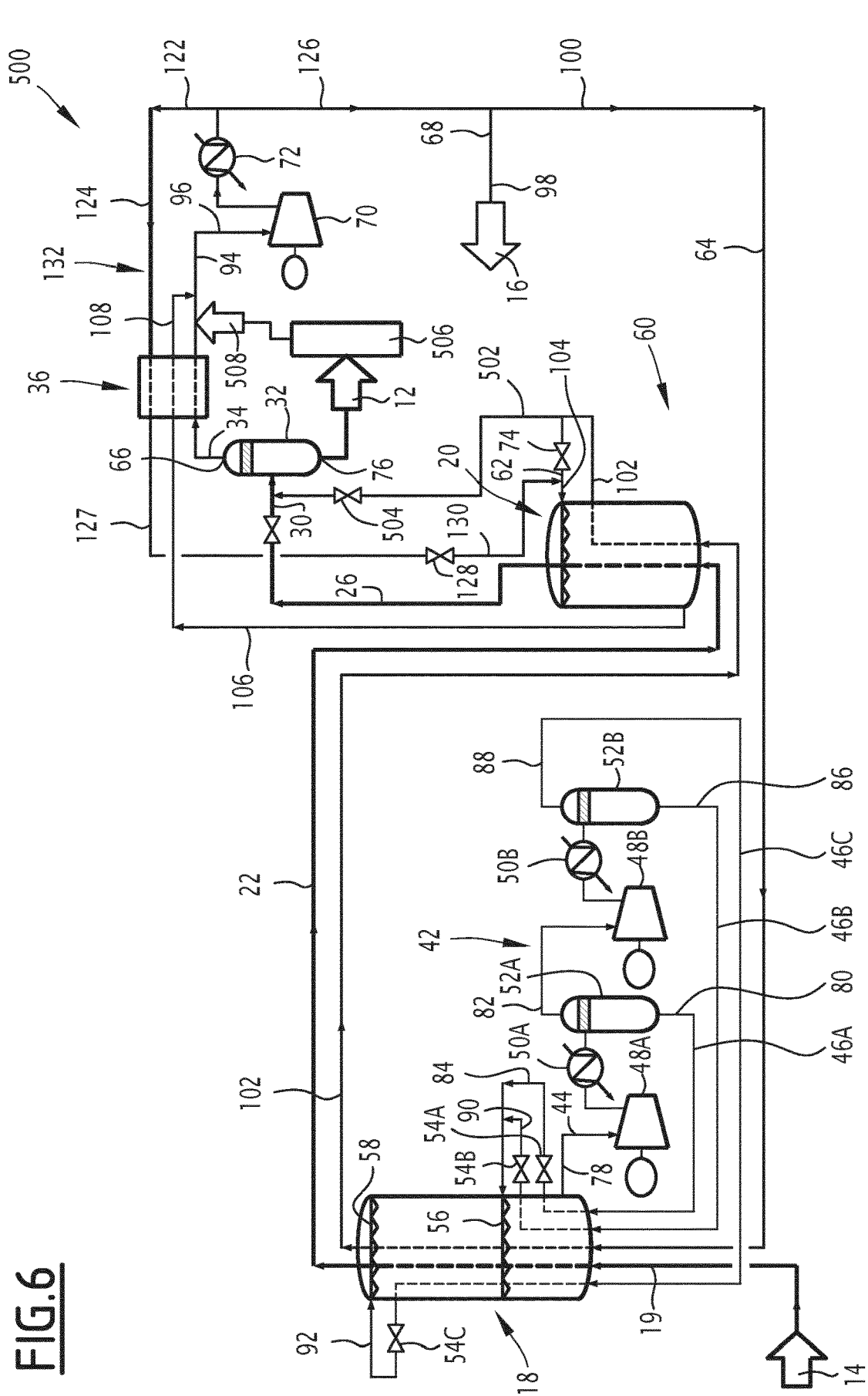

With reference to FIG. 6, a plant 500 which is a variant of the plant 120, is described. The plant 500 is similar to the plant 120 shown in FIG. 2. Identical elements bear the same numerical references and will not be described again. Only the differences are described in detail hereinafter.

Like in FIG. 5, another part 502 of the stream of cooled second refrigerant fluid 102 is expanded in an expansion valve 504 and taken into the flash gas separator 32.

The plant 500 advantageously comprises a storage 506 receiving the liquefied natural gas 12 coming from the flash gas separator 32.

An evaporation gas 508 (boil-off gas) is taken from the storage 506 and feeds the second refrigeration cycle 60. More precisely, the evaporation gas 508 is added to the heated flow 94, e.g. upstream of the compressor 72, as in FIG. 5.

Figure 7:
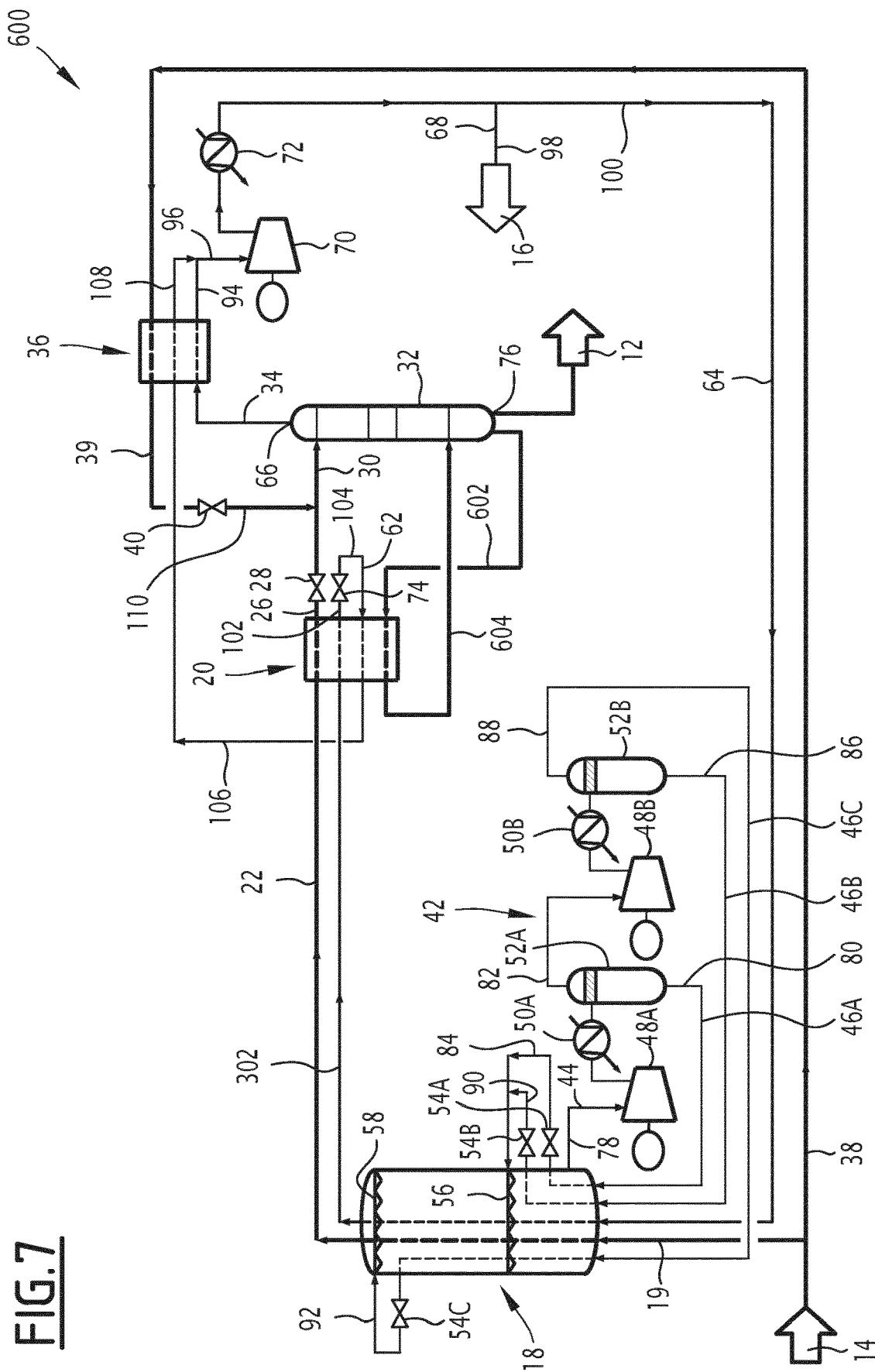

With reference to FIG. 7, a plant 600 which is a variant of the plant 300, is described. The plant 600 is similar to the plant 300 shown in FIG. 4. Identical elements bear the same numerical references and will not be described again. Only the differences are described in detail hereinafter.

A reboiler of the denitrogenation column is integrated into the second heat exchanger 20. The above contributes to sub-cooling the first stream of liquefied natural gas 22 into the second stream of sub-cooled liquefied natural gas 26. A liquid flow 602 rich in nitrogen is extracted from the flash gas separator 32 and led into the second heat exchanger which acts as a reboiler. The liquid flow 602 partially vaporizes in the second heat exchanger 20 and forms a two-phase flow 604 which is returned to the denitrogenation column 32.

The variants described hereinabove with reference to FIGS. 2 to 7 have advantages similar to the advantages of the plant 10. If appropriate, when technically possible, such variants are combined with each other to form other variants.
Comparison of the Different Variants with a Prior Art with Only One Refrigeration Cycle with Mixed Refrigerant

TABLE 1

| | | Prior art "SMR" | FIG. 1 | FIG. 2 | FIG. 3 | FIG. 4 | FIG. 5 | FIG. 6 | FIG. 7 |
|---|---|---|---|---|---|---|---|---|---|
| Natural gas (feed) | | | | | | | | | |
| Pression | bar | 70 | 70 | 70 | 70 | 70 | 70 | 70 | 70 |
| Temperature | ° C. | 25 | 25 | 25 | 25 | 25 | 25 | 25 | 25 |
| Flow-rate | kmol/h | 3105 | 3105 | 3105 | 3105 | 3105 | 3105 | 3105 | 3105 |
| Composition | | | | | | | | | |
| N2 | Molar fraction | 0.0080 | 0.0080 | 0.0080 | 0.0080 | 0.0080 | 0.0080 | 0.0080 | 0.0500 |
| C1 | Molar fraction | 0.9200 | 0.9200 | 0.9200 | 0.9200 | 0.9200 | 0.9200 | 0.9200 | 0.8780 |
| C2 | Molar fraction | 0.0500 | 0.0500 | 0.0500 | 0.0500 | 0.0500 | 0.0500 | 0.0500 | 0.0500 |
| C3 | Molar fraction | 0.0220 | 0.0220 | 0.0220 | 0.0220 | 0.0220 | 0.0220 | 0.0220 | 0.0220 |

TABLE 1-continued

| | | Prior art "SMR" | FIG. 1 | FIG. 2 | FIG. 3 | FIG. 4 | FIG. 5 | FIG. 6 | FIG. 7 |
|---|---|---|---|---|---|---|---|---|---|
| First cooling fluid | | | | | | | | | |
| Flow-rate | kmol/h | 5480 | 5115 | 5149 | 4650 | 5100 | 5448 | 5445 | 4990 |
| Compression power | kW | 13568 | 11669 | 11729 | 11296 | 11667 | 12485 | 12420 | 11451 |
| Composition | | | | | | | | | |
| N2 | Molar fraction | 0.0182 | 0.0000 | 0.0000 | 0.0151 | 0.0000 | 0.0000 | 0.0000 | 0.0000 |
| C1 | Molar fraction | 0.2920 | 0.2627 | 0.2462 | 0.2473 | 0.2627 | 0.2698 | 0.2562 | 0.2685 |
| C2 | f Molar fraction | 0.3467 | 0.3922 | 0.4221 | 0.3914 | 0.3922 | 0.3888 | 0.4040 | 0.4008 |
| C3 | f Molar fraction | 0.1916 | 0.1941 | 0.1709 | 0.1720 | 0.1941 | 0.1890 | 0.1837 | 0.1743 |
| iC5 | Molar fraction | 0.1515 | 0.1510 | 0.1608 | 0.1742 | 0.1510 | 0.1523 | 0.1561 | 0.1563 |
| LNG flow-rate | kmol/h | 2848 | 2830 | 2852 | 2850 | 2829 | 2978 | 2978 | 2676 |
| Compressor 70 | kW | 992 | 2845 | 2878 | 3391 | 2584 | 3268 | 3249 | 2601 |
| BOG | kW | 374 | 374 | 374 | 374 | 374 | | | 366 |
| Total power | kW | 14934 | 14888 | 14981 | 15061 | 14625 | 15753 | 15669 | 14417 |
| Specific power | kW/kmol | 5.24 | 5.26 | 5.25 | 5.28 | 5.17 | 5.29 | 5.26 | 5.39 |
| | base 100 | 100 | 100.3 | 100.2 | 100.8 | 98.6 | 100.9 | 100.3 | 102.8 |

The above table specifies the composition of the first refrigerant fluid and the powers consumed. Same shows on the last two lines, the specific power consumed for producing the LNG flow 12.

It can be seen that the specific powers consumed are substantially equal to the specific power of the prior art. Thereby, the reduction of the footprint of the plant 10 does not come at the expense of the energy consumed for producing LNG.

The invention claimed is:

1. A method for producing liquefied natural gas from natural gas, comprising:
   cooling at least a first part of the natural gas in a first heat exchanger by heat exchange with a first refrigerant and obtaining a first stream of liquefied natural gas, the first refrigerant being a mixed refrigerant,
   circulating the first refrigerant fluid in a first closed refrigeration cycle,
   sub-cooling the first stream of liquefied natural gas in a second heat exchanger by heat exchange with a second refrigerant distinct from the first refrigerant, and obtaining a second stream of sub-cooled liquefied natural gas,
   expanding the second stream of sub-cooled liquefied natural gas for forming a third stream of liquefied natural gas, and conveying the third stream of liquefied natural gas to a flash gas separator,
   withdrawing, at the bottom of the flash gas separator, the liquefied natural gas produced,
   circulating the second refrigerant fluid in a second refrigeration cycle, said circulating comprising at least: cooling the second refrigerant fluid at least in the first heat exchanger by heat exchange with the first refrigerant fluid for obtaining a stream of cooled second refrigerant fluid; expanding at least a part of the stream of cooled second refrigerant; obtaining a stream of cooled and expanded second refrigerant; and receiving the stream of cooled and expanded second refrigerant fluid into the second heat exchanger for cooling the first stream of liquefied natural gas, and
   withdrawing, at the head of the flash gas separator, a gas flow, and feeding the second refrigeration cycle with at least a part of said gas flow,
   wherein at least another part of the stream of cooled second refrigerant is expanded and taken into the flash gas separator.

2. The method according to claim 1, further comprising diverting a first portion of the second refrigerant out of the second refrigerant cycle for producing a combustible gas.

3. The method according to claim 1, further comprising:
   cooling a second part of the natural gas in a third heat exchanger by heat exchange with the second refrigerant fluid and with the gas flow withdrawn from the head of the flash gas separator, and obtaining a fourth stream of liquefied natural gas,
   expanding the fourth stream of liquefied natural gas, and receiving the fourth stream of liquefied and expanded natural gas into the flash gas separator.

4. The method according to claim 1, further comprising:
   diverting a second part of the second refrigerant fluid out of the second refrigeration cycle,
   cooling the second part of the second refrigerant fluid in the third heat exchanger by heat exchange with the gas flow withdrawn from the head of the flash gas separator and with a gas flow of second fluid refrigerant coming from the second heat exchanger, and obtaining a second stream of cooled second refrigerant,
   expanding the second stream of cooled second refrigerant liquid for obtaining a second stream of cooled and expanded second refrigerant liquid, and
   receiving the second stream of cooled and expanded second refrigerant liquid into the second heat exchanger for cooling the first stream of liquefied natural gas.

5. The method according to claim 1, wherein expanding the at least another part of the stream of cooled second refrigerant is performed at least in part in an expansion valve.

6. The method according to claim 1, wherein:
   the stream of cooled second refrigerant fluid is gaseous at the outlet of the first heat exchanger, said expanding the stream of cooled second refrigerant fluid is carried out at least partly in a turbine, and
said circulating the second refrigerant fluid in the second refrigeration cycle comprises at least one compression of the second refrigerant fluid carried out by at least one compressor mechanically coupled to said turbine.

7. The method according to claim 1, wherein said cooling the second refrigerant further comprises flowing the second refrigerant through the second heat exchanger prior to said expanding the stream of cooled second refrigerant.

8. The method according to claim 1, further comprising:
receiving the liquefied natural gas into a storage,
withdrawing an evaporation gas from the storage, and
feeding the second refrigeration cycle with at least a part of the evaporation gas.

9. A plant for producing liquefied natural gas from natural gas, comprising:
a first heat exchanger suitable for cooling at least a first part of the natural gas by heat exchange with a first refrigerant and for obtaining a first stream of liquefied natural gas, the first refrigerant being a mixed refrigerant,
a first closed refrigeration cycle suitable for circulating the first refrigerant fluid,
a second heat exchanger suitable for sub-cooling the first stream of liquefied natural gas by heat exchange with a second refrigerant distinct from the first refrigerant, and for obtaining a second stream of sub-cooled liquefied natural gas,
an expansion component suitable for expanding the second stream of sub-cooled liquefied natural gas and for forming a third stream of liquefied natural gas,
a flash gas separator suitable for receiving the third stream of liquefied natural gas,
a withdrawal system, at the bottom of the flash gas separator, suitable for withdrawing the liquefied natural gas produced,
a second refrigeration cycle including a conduit suitable for circulating the second refrigerant fluid, and for: cooling the second refrigerant fluid at least in the first heat exchanger by heat exchange with the first refrigerant fluid and obtaining a stream of cooled second refrigerant fluid; expanding, with a first expander, at least a portion of the stream of cooled second refrigerant; obtaining a stream of cooled and expanded second refrigerant; and taking the stream of cooled and expanded second refrigerant into the second heat exchanger for cooling the first stream of liquefied natural gas, and further including a branch point upstream of the first expander and a second conduit for expanding at least a second portion of the stream of cooled second refrigerant and taking the at least second portion into the flash gas separator; and
a withdrawal system, at the head of the flash gas separator, suitable for withdrawing a gas flow, and for feeding the second refrigeration cycle with at least a part of said gas flow.

10. A method for producing liquefied natural gas from natural gas, comprising:
cooling at least a first part of the natural gas in a first heat exchanger by heat exchange with a first refrigerant and obtaining a first stream of liquefied natural gas, the first refrigerant being a mixed refrigerant,
circulating the first refrigerant fluid in a first closed refrigeration cycle,
sub-cooling the first stream of liquefied natural gas in a second heat exchanger by heat exchange with a second refrigerant distinct from the first refrigerant, and obtaining a second stream of sub-cooled liquefied natural gas,
expanding the second stream of sub-cooled liquefied natural gas for forming a third stream of liquefied natural gas, and conveying the third stream of liquefied natural gas to a flash gas separator,
withdrawing, at the bottom of the flash gas separator, the liquefied natural gas produced,
circulating the second refrigerant fluid in a second refrigeration cycle, said circulating comprising at least: cooling the second refrigerant fluid at least in the first heat exchanger by heat exchange with the first refrigerant fluid for obtaining a stream of cooled second refrigerant fluid; expanding at least a part of the stream of cooled second refrigerant; obtaining a stream of cooled and expanded second refrigerant; and receiving the stream of cooled and expanded second refrigerant fluid into the second heat exchanger for cooling the first stream of liquefied natural gas,
withdrawing, at the head of the flash gas separator, a gas flow, and feeding the second refrigeration cycle with at least a part of said gas flow,
diverting a second part of the second refrigerant fluid out of the second refrigeration cycle,
cooling the second part of the second refrigerant fluid in the third heat exchanger by heat exchange with the gas flow withdrawn from the head of the flash gas separator and with a gas flow of second fluid refrigerant coming from the second heat exchanger, and obtaining a second stream of cooled second refrigerant,
expanding the second stream of cooled second refrigerant liquid for obtaining a second stream of cooled and expanded second refrigerant liquid, and
receiving the second stream of cooled and expanded second refrigerant liquid into the second heat exchanger for cooling the first stream of liquefied natural gas.

* * * * *